(12) United States Patent
Hamberger

(10) Patent No.: US 10,297,383 B2
(45) Date of Patent: May 21, 2019

(54) DEVICE AND METHOD FOR REDUCING A MAGNETIC UNIDIRECTIONAL FLUX COMPONENT IN THE CORE OF A THREE-PHASE TRANSFORMER

(71) Applicant: Siemens Aktiengesellschaft, Munich (DE)

(72) Inventor: Peter Hamberger, Kirchschlag bei Linz (AT)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 15/038,843

(22) PCT Filed: Dec. 10, 2013

(86) PCT No.: PCT/EP2013/076095
§ 371 (c)(1),
(2) Date: May 24, 2016

(87) PCT Pub. No.: WO2015/086047
PCT Pub. Date: Jun. 18, 2015

(65) Prior Publication Data
US 2017/0169937 A1 Jun. 15, 2017

(51) Int. Cl.
*H01F 27/34* (2006.01)
*H01F 27/38* (2006.01)
(Continued)

(52) U.S. Cl.
CPC ............ *H01F 27/34* (2013.01); *H01F 27/38* (2013.01); *H01F 30/12* (2013.01); *H01F 27/345* (2013.01); *H02H 7/04* (2013.01); *H02H 7/045* (2013.01)

(58) Field of Classification Search
USPC .......................................................... 361/35
See application file for complete search history.

(56) References Cited

U.S. PATENT DOCUMENTS

| 7,489,485 B2 | 2/2009 | AF Klercker Alakula et al. |
| 9,046,901 B2 | 6/2015 | Hamberger et al. |
| (Continued) | | |

FOREIGN PATENT DOCUMENTS

| CN | 201733096 | 2/2011 |
| CN | 102064759 | 5/2011 |
| (Continued) | | |

OTHER PUBLICATIONS

Office Action dated Dec. 27, 2016 which issued in the corresponding Chinese Patent Application No. 201380081546.8.
(Continued)

*Primary Examiner* — Danny Nguyen
(74) *Attorney, Agent, or Firm* — Cozen O'Connor

(57) ABSTRACT

A device for reducing a magnetic unidirectional flux component in the core of a three-phase transformer includes at least one compensation winding, which is magnetically coupled to the core of the three-phase transformer, a switch arranged electrically in a current path in series with the at least one compensation winding to feed current into the winding, where the effect of the current is directed opposite to the unidirectional flux component, and an apparatus for limiting current arranged electrically in a current path in series with the at least one compensation winding, and where two compensation windings are provided on different legs of the core of the three-phase transformer such that a greater reduction of the magnetic unidirectional flux component is achieved.

6 Claims, 2 Drawing Sheets

(51) Int. Cl.
*H01F 30/12* (2006.01)
*H02H 7/04* (2006.01)
*H02H 7/045* (2006.01)

(56) References Cited

U.S. PATENT DOCUMENTS

| | | |
|---|---|---|
| 2006/0197511 A1 | 9/2006 | AF Klercker Alakula |
| 2010/0194373 A1* | 8/2010 | Hamberger ............. H01F 27/34 323/356 |
| 2013/0201592 A1* | 8/2013 | Hamberger ............. H01F 27/38 361/157 |

FOREIGN PATENT DOCUMENTS

| | | |
|---|---|---|
| CN | 202159567 | 3/2012 |
| CN | 103270562 | 8/2013 |
| EP | 1766746 | 3/2007 |
| WO | WO 2005/001857 | 1/2005 |
| WO | WO 2005/109593 | 11/2005 |
| WO | WO 2012/041368 | 4/2012 |

OTHER PUBLICATIONS

Office Action dated Dec. 27, 2018 issued in Indian Patent Application No. 201617018281.

\* cited by examiner

DEVICE AND METHOD FOR REDUCING A MAGNETIC UNIDIRECTIONAL FLUX COMPONENT IN THE CORE OF A THREE-PHASE TRANSFORMER

CROSS-REFERENCE TO RELATED APPLICATIONS

This is a U.S. national stage of application No. PCT/EP2013/076095 filed 10 Dec. 2013.

BACKGROUND OF THE INVENTION

1. Field of the Invention

The invention relates to a method and device for reducing a magnetic unidirectional flux component in the core of a three-phase transformer.

2. Description of the Related Art

Electrical transformers, such as those used in energy distribution networks, can be subject to the unwanted injection of a direct current into a primary winding or secondary winding. The injection of a direct current of this kind, hereinafter also referred to as the DC component can, for example, originate from electronic structural components such as are used nowadays to control electrical drives or even for power-factor compensation. Another cause could be "geomagnetically induced currents" (GIC).

In the core of the transformer, a DC component results in a flux component that superposes the alternating flux. This results in an asymmetrical control of the magnetic material in the core and is associated with a series of drawbacks. Even a direct current of a few amperes can cause local heating in the transformer, which can impair the lifetime of the winding insulation. A further unwanted effect is increased noise emission during operation of the transformer because modern transformer cores have very high magnetic conductivity and, hence, even small currents are sufficient to cause the transformer core to reach saturation in a half-cycle of the alternating current.

Various apparatuses that work actively and passively to reduce the operating noise of a transformer are known. According to WO 2012/041368 A1, an electric voltage is induced into the compensation winding and employed for the compensation of the disruptive magnetic unidirectional flux component. Here, an electronic switching unit generates a compensation current, where the switching-on of the switching unit follows a prespecified switching strategy, for example, via phase-angle control. Here, a thyristor switch is connected in series with a current-limiting reactor to introduce the compensation current into the compensation winding.

The above-described measures reduce the thermal loading of the winding of the transformer and also reduce losses and noises. The device for reducing a magnetic unidirectional flux component can be implemented with relatively simple means using discrete and/or programmable modules. No energy store, such as a battery or a capacitor, is required for the generation of the compensation current. Instead, the energy for the generation of the compensation current is taken directly from the compensation winding. Due to its simplicity, the circuit arrangement is very reliable and is well suited for the low-maintenance long-term operation of a transformer in an energy distribution network. The field of operation includes both transformers in the low- or medium-voltage range and very powerful transformers (power transformers, HVDC (high-voltage DC transmission) transformers). Neither the size nor safety-relevant apparatuses or other design criteria of the transformer are influenced unfavorably by the use of the system.

To enable the device for reducing a magnetic unidirectional flux component to be produced with inexpensive standard components and to keep this device within the officially defined voltage limits, such as with the voltage limits defined in the Low Voltage Directive (Directive 2006/95/EC), the permitted voltage induced in the compensation winding is limited in practice to a specific value, according to the Low Voltage Directive to 690 V.

Therefore, since the turn-to-turn voltage of an existing compensation winding increases with the nominal power of the three-phase transformer, the number of turns of the compensation winding can be kept very low. This can mean that with this low number of turns it is only possible to achieve a relatively weak magnetic field, which is not sufficient for any significant reduction of the magnetic unidirectional flux component. If the number of turns of the compensation winding were increased, in many applications, the prespecified maximum voltage would be exceeded. In this case, the device for reducing a magnetic unidirectional flux component could not be used.

SUMMARY OF THE INVENTION

In view of the foregoing, it is therefore an object of the present invention to provide a device for reducing a magnetic unidirectional flux component in the core of a three-phase transformer, which permits a greater reduction of a magnetic unidirectional flux component for a given compensation winding.

This and other objects and advantages are achieved in accordance with the invention by a method and device comprising at least one compensation winding magnetically coupled to the core of the three-phase transformer, a switch arranged electrically in a current path in series with the compensation winding to feed a current into the compensation winding, where the effect of the current is directed opposite the unidirectional flux component, and an apparatus for limiting current arranged electrically in a current path in series with the compensation.

In accordance with the invention, two compensation windings on respective different legs of the core of the three-phase transformer are provided, the two compensation windings are connected in series to each other, the input of the primary and the output of the secondary compensation winding are each connected to the input of one of the two windings of a single-phase transformer, and the outputs of the windings of the single-phase transformer are short-circuited and connected via the switching unit to the connection between the output of the primary compensation winding and the input of the secondary compensation winding.

At the same time, when idling (i.e., when the switch blocks the current path to the compensation windings), the two windings of the single-phase transformer are operated as an inductive voltage divider. On the other hand, with a closed switch, the two windings function as reactors for the compensation currents that are then flowing.

In comparison to a relevant device with only one compensation winding, the two compensation windings according to the invention can then (i) either have the same design, where both compensation windings then have the same number of turns as previously so that overall the core of the three-phase transformer is supplied with a higher compensation current than is the case with only one compensation winding, or (ii) the two compensation windings can have a lower number of turns in order to still achieve the same compensation current that is achieved with a conventional single compensation winding.

As a rule, the two compensation windings have the same configuration. The two windings of the single-phase transformer also have the same configuration as a rule; they must in any case have the same number of turns.

The switch can comprise at least one semiconductor switch, preferably a thyristor. The advantage of using a thyristor consists in the fact that a thyristor can be "ignited" by a current pulse, i.e., it can be transferred to a conductive state. During the positive half-wave of the main voltage, the thyristor has the property of a diode until the next current zero. The end of the current flow is effected by the thyristor itself in that the holding current is undershot and the thyristor automatically "clears", i.e., transfers to the non-conductive state. It should be understood other semiconductor switches, such as GTO, IGBT transistors or other switching elements are also conceivable.

The switch can advantageously be connected to a control unit, which is connected to a measuring apparatus for the acquisition of the magnetic unidirectional flux component.

A measuring apparatus for the acquisition of the magnetic unidirectional flux component is known, for example, from WO 2012/041368 A1, which comprises a magnetic shunt part with a sensor coil. The shunt is arranged on the core of the transformer, such as on a leg or on a yoke, in order to route a part of the magnetic flow in a bypass. It is very easy to obtain a sensor signal with long-term stability from this magnetic flux routed in the shunt via a sensor coil where this sensor signal (optionally after signal conditioning) depicts the unidirectional flux component (DC component) very well. The measuring result is to a large extent free of drift and has long-term stability. This detector substantially comprises the shunt part and the sensor coil arranged thereon. Accordingly, it is highly reliable.

The sensor signal from the measuring apparatus for the acquisition of the magnetic unidirectional flux component is supplied to the control apparatus. At the same time, the switching unit is, for example, controlled by a regulating variable, which is predetermined by a timing element disposed in the control apparatus, where the timing element is triggered by a phase detector that detects the phase of the voltage induced in the compensation winding. The timing element can be formed as a discrete module or as a part of a digital circuit. It can be advantageous for the regulating variable to be the result of a computer operation of a microprocessor. Here, the microprocessor can simultaneously also be used for the signal conditioning of the sensor signal. The switch can, for example, be controlled such that a pulsating direct current is fed into the compensation winding. This has the advantage that the arithmetic mean value of this pulsating direct current can be predetermined very simply in accordance with the DC component to be compensated. Advantageously, for the purpose of reducing the magnetic energy stored in the inductance, the electronic switch remains switched on until the pulsating direct current has decayed. Hence, when the electric switch has switched off, an overvoltage protection is required to absorb virtually no residual magnetic energy stored in the coil.

It can be favorable for the switch and the control apparatus to be arranged outside the tank of a transformer. This makes the entire electronic circuit accessible from the exterior for inspection and maintenance. The method in accordance with the invention for operating a system provides that the control unit comprises a timing element, which is triggered by a phase detector, which detects the phase of the voltage induced in the compensation windings and the switching unit is controlled such that a pulsating direct current is fed into the compensation windings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a further explanation of the invention, the following part of the description refers to the figures from which further advantageous embodiments, details and embodiments of the invention can be derived, in which.

DETAILED DESCRIPTION OF THE EXEMPLARY EMBODIMENTS

Figure 1:
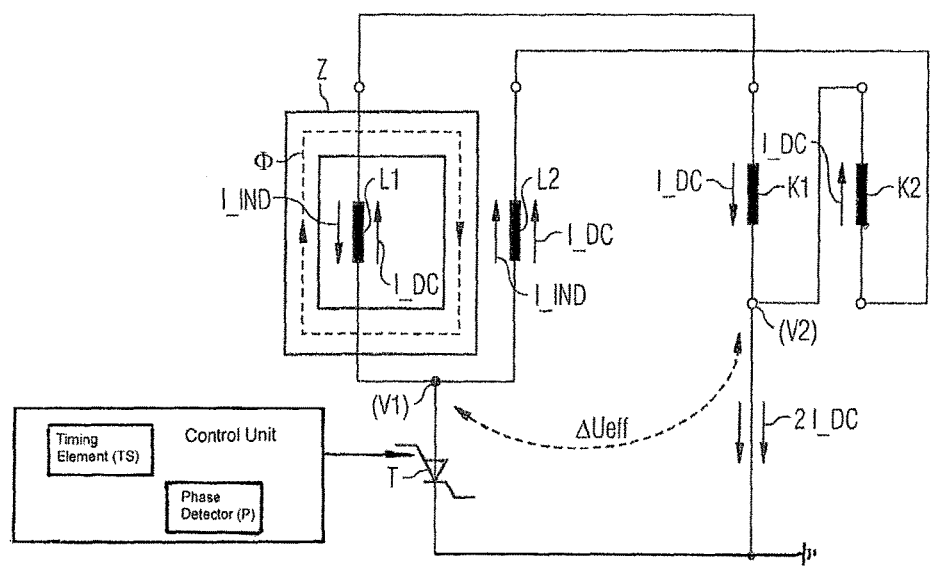
FIG. 1 is a schematic block diagram of the device in accordance with the invention.

With reference to FIG. 1, the device in accordance with the invention substantially comprises two compensation windings K1 and K2, where each of them is wound about a different leg of a three-phase transformer. For example, one compensation winding can be wound around an external leg, and the other around the middle leg. Hence, the compensation windings K1, K2 are housed in the transformer tank and magnetically coupled to the core of the transformer. K1 and K2 each have only a few, as a rule less than ten, turns.

The single-phase transformer with its two windings L1, L2 is also arranged in the transformer tank of the three-phase transformer.

During the operation of the transformer, an electrical voltage is induced in the compensation windings K1, K2 and used in accordance with the invention to combat the disruptive direct component of the magnetic flux in the core. This is performed by mains-synchronous switching of a switch T which, here, comprises a thyristor. The switch T is arranged electrically in series with the compensation windings K1, K2 to feed a compensation current I_DC into the compensation windings K1, K2, where the effect of the current is directed opposite the unidirectional flux component.

The two compensation windings K1, K2 are connected in series to each other, where the output of the primary compensation winding K1 is connected to the input of the secondary compensation winding K2. The input of the primary compensation winding K1 and the output of the secondary compensation winding K2 are each connected to the input of one of the two windings L1, L2 of the single-phase transformer. The outputs of the windings L1, L2 of the single-phase transformer are short-circuited in the nodal point X1 and connected to the nodal point V2 via the switch T, i.e., connected to the connection between the output of the primary compensation winding K1 and the input of the secondary compensation winding K2. The potential of the nodal point X2 is connected to ground.

The two windings L1, L2 of the single-phase transformer have a common core, which is here formed here as a two-legged core Z, where one of the windings L1, L2 is located on each leg.

Figure 2:
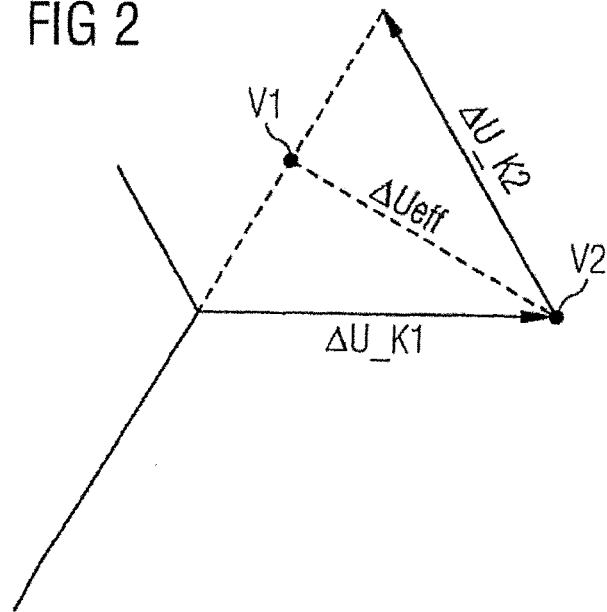
FIG. 2 is a vector diagram with the voltages that occur in the device of FIG. 1.

The voltage induced between the input of the primary compensation winding K1 and the output of the secondary compensation winding K2 corresponds to the sum of the voltages ΔU_K1, ΔU_K2 induced in the two windings K1, K2 (see FIG. 2). When blocked by the switch T, the two windings L1, L2 operate as single-phase transformers in idling mode in which, according to the voltage applied, an alternating flux is excited and a corresponding induced current I_IND flows. The half voltage is established at the connections of the two windings L1, L2, i.e., in the nodal point X1. This results in an effective potential difference ΔUeff of 0.886 of the induced voltage ΔU_K1 or ΔU_K2 between the potential V1 at the nodal point X1 and the potential V2 at the nodal point X2. This voltage is also applied to the switch T and is the dimensioning voltage for the number of turns in the compensation windings K1, K2, which, for example, can be maximum 690 V for applications in the EU.

Therefore, if only the switch T opens, in this case the thyristor ignites and the compensation current I_DC starts to flow. This does not have any additional magnetizing effect on the core of the single-phase transformer and, hence, the two windings L1, L2 function as reactors and therefore function as current-limiting reactors. Due to the series connection of the compensation windings K1, K2, the "ampere-turns", introduced, i.e., the magnetomotive force of the core, are accumulated with respect to the core of the three-phase transformer. That is, the compensation current I_DC does not only act on the core in one compensation winding, as is the case with numerous conventional systems, but in two compensation windings K1, K2.

Therefore, if in addition to an existing compensation winding K1, a second identical compensation winding K2 is additionally established, then only an effective voltage of 0.886 of the induced voltage that would be applied with only one compensation winding is applied to the switch T. Hence, it is possible either that these two compensation windings in accordance with the invention K1, K2 could be used with three-phase transformers with a dimensioning turn-to-turn voltage of more than 690 V, i.e., up to 800 V or that the number of turns of the compensation windings K1, K2 could be increased by a factor of 2.31 without exceeding the maximum turn-to-turn voltage.

The switch T can be controlled in the manner as described in WO 2012/041368 A1, which corresponds to U.S. Pat. No. 9,046,901, the contents of which are incorporated herein by reference in its entirety, and where the control unit substantially comprises a phase detector and a timing element. The phase detector, for example, a zero-passage detector, derives a trigger signal from the induced voltage that is fed to a timing element. Together with a control signal that is also fed to the control unit, the control unit provides a regulating variable on the output side, that is fed to the electronic switch T. In this case, the inductances of the windings L1, L2 are dimensioned such that, when the switch T is switched through, a sinusoidal pulsating current flow flowing in the current direction is fed into the compensation windings K1, K2.

This pulsating direct current consists of the superposition of two half-waves from the induced voltages and an intermediate current gap. At the same time, at the end of the direct current pulse, the switch T is switched to a de-energized state, for example, in that the holding current of the thyristor is undershot.

Figure 3:
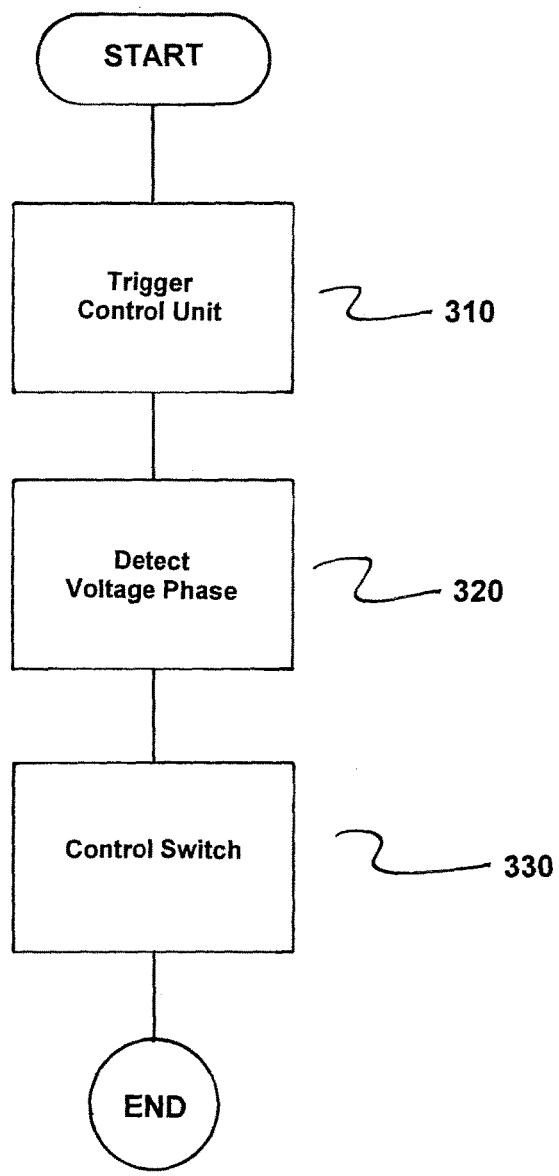
FIG. 3 is a flowchart of the method in accordance with the invention.

FIG. 3 is a flowchart of a method for operating a device for reducing a magnetic unidirectional flux component in a core of a three-phase transformer comprising at least one compensation winding (K1, K2) magnetically coupled to the core of the three-phase transformer, a switch (T) arranged electrically in a current path in series with the at least one compensation winding (K1, K2) to feed a current (I_DC) into the at least one compensation winding, and an apparatus configured to limit current (L1, L2). The method comprises triggering, by a phase detector, a control unit comprising a timing element, as indicated in step 310.

Next, the phase of the voltage induced in the at least one compensation winding (K1, K2) is detected by the timing element, as indicated in step 310.

The switch is now controlled by the control unit such that a pulsating direct current is fed into the at least one compensation winding (K1, K2), as indicated in step 330.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for reducing a magnetic unidirectional flux component in a core of a three-phase transformer, comprising:
   at least one compensation winding which is magnetically coupled to the core of the three-phase transformer;
   a switch which is arranged electrically in a current path in series with the compensation winding to feed a current into the at least one compensation winding, an effect of said current being directed oppositely to a unidirectional flow component; and
   a current limiter, said current limiter being arranged electrically in a current path in series with the at least one compensation winding, two compensation windings being provided on respective different legs of the core of the three-phase transformer, the two compensation windings being connected in series to each other, an input of a primary and an output of the secondary compensation winding each being connected to an input of one of two windings of a single-phase transformer, and outputs of the two windings of the single-phase transformer being short-circuited and connected via the switch to a connection between an output of the primary compensation winding and an input of the secondary compensation winding.

2. The device as claimed in claim 1, wherein the switch comprises at least one semiconductor switch.

3. The device as claimed in claim 1, wherein the switch is connected to a control unit, which is connected to a measuring apparatus for acquisition of the magnetic unidirectional flux component.

4. The device as claimed in claim 2, wherein the switch is connected to a control unit, which is connected to a measuring apparatus for acquisition of the magnetic unidirectional flux component.

5. The device as claimed in claim 1, wherein the at least one semiconductor switch is a thyristor.

6. A method for operating a device for reducing a magnetic unidirectional flux component in a core of a three-phase transformer comprising at least one compensation winding magnetically coupled to the core of the three-phase transformer, a switch arranged electrically in a current path in series with the at least one compensation winding to feed a current into the at least one compensation winding, an effect of said current being directed oppositely to a unidirectional flow component, and a current limiter, said current limiter being arranged electrically in a current path in series with the at least one compensation winding, the method comprising:

triggering, by a phase detector, a control unit comprising a timing element;

detecting, by the timing element, a phase of voltage induced in the at least one compensation winding; and controlling the switch, by the control unit, such that a pulsating direct current is fed into the at least one compensation winding:, wherein the device comprises two compensation windings provided on respective different legs of the core of the three-phase transformer;

wherein the two compensation windings are connected in series to each other;

wherein an input of a primary and an output of the secondary compensation winding are each connected to an input of one of two windings of a single-phase transformer; and wherein outputs of the two windings of the single-phase transformer are short-circuited and connected via the switch to a connection between an output of the primary compensation winding and an input of the secondary compensation winding.

\* \* \* \* \*